United States Patent [19]

Schifman

[11] 3,946,522

[45] Mar. 30, 1976

[54] WINDOW MOUNTED PLANTER BOX

[75] Inventor: Edward J. Schifman, Nashville, Tenn.

[73] Assignee: Aladdin Industries, Inc., Chicago, Ill.

[22] Filed: Sept. 16, 1974

[21] Appl. No.: 506,561

[52] U.S. Cl. ........................................ 47/36; 47/40
[51] Int. Cl.² ...................... A01G 9/02; A47G 7/00
[58] Field of Search .............. 47/17, 26, 28, 29, 34, 47/34.13, 36, 37, 38, 40; 312/330, 330 X, 332, 334; 248/466, 472, 475 R; D9/219; 108/47, 46

[56] References Cited
UNITED STATES PATENTS

| | | | |
|---|---|---|---|
| 1,214,057 | 1/1917 | Moore | 47/40 |
| 1,224,127 | 5/1917 | Bartlett | 108/47 |
| 1,380,237 | 5/1921 | Neff | 47/40 |
| 2,086,247 | 7/1937 | Thesen | 47/17 X |
| 2,156,746 | 5/1939 | Steinmetz | 47/40 |
| 2,631,912 | 5/1953 | Pryor | 108/46 |
| 2,709,838 | 6/1955 | Zausner | 47/17 |
| 2,834,441 | 5/1958 | Mims | 47/40 |
| 3,002,236 | 10/1961 | Humphner | 47/36 |
| 3,106,801 | 10/1963 | Risacher | 47/38 X |
| 3,127,697 | 4/1964 | Romenko | 47/40 |
| 3,606,112 | 9/1971 | Cheshier | 312/246 |
| 3,698,143 | 10/1972 | Francis | 47/36 |
| D212,437 | 10/1968 | Paxton | D9/219 UX |

FOREIGN PATENTS OR APPLICATIONS

| | | | |
|---|---|---|---|
| 775,839 | 5/1957 | United Kingdom | 311/22 |
| 698,095 | 10/1953 | United Kingdom | 47/40 UX |

*Primary Examiner*—Edgar S. Burr
*Assistant Examiner*—James R. Feyrer
*Attorney, Agent, or Firm*—McDougall, Hersh & Scott

[57] ABSTRACT

A device for growing houseplants is disclosed. The device is adapted to extend from a window such that the plants provided therein receive adequate sunlight. The device is enclosed on all sides extending from the window to protect the plants from exposure to temperature excesses. The rear of the box is open and communicates with the interior of a room to maintain the plants at a temperature substantially equivalent to the indoor temperature. The device is provided with a pull-out drawer to provide easy access to the plants and vents for permitting outside air to enter the device. Flexible baffle curtains are provided so that the entire window area through which the planter box extends may be closed off from the outside.

9 Claims, 6 Drawing Figures

U.S. Patent  March 30, 1976  Sheet 1 of 2  3,946,522
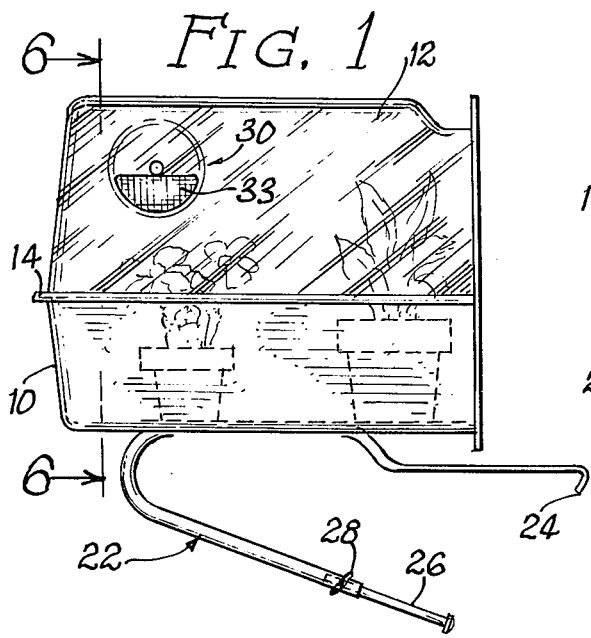
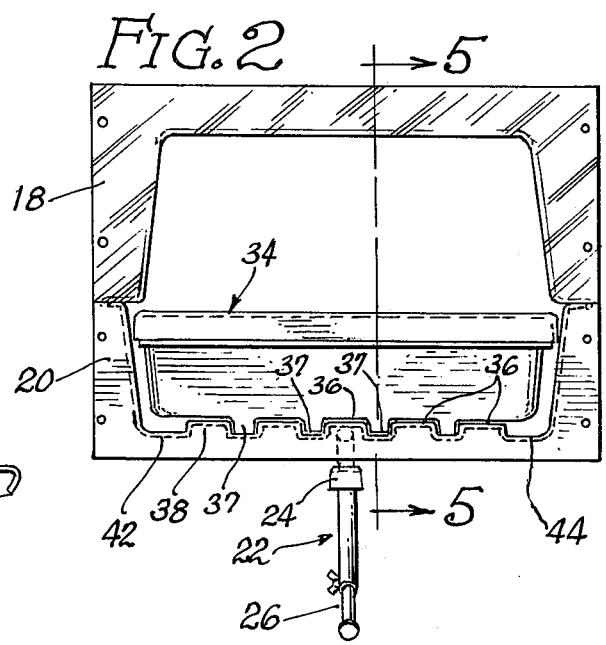
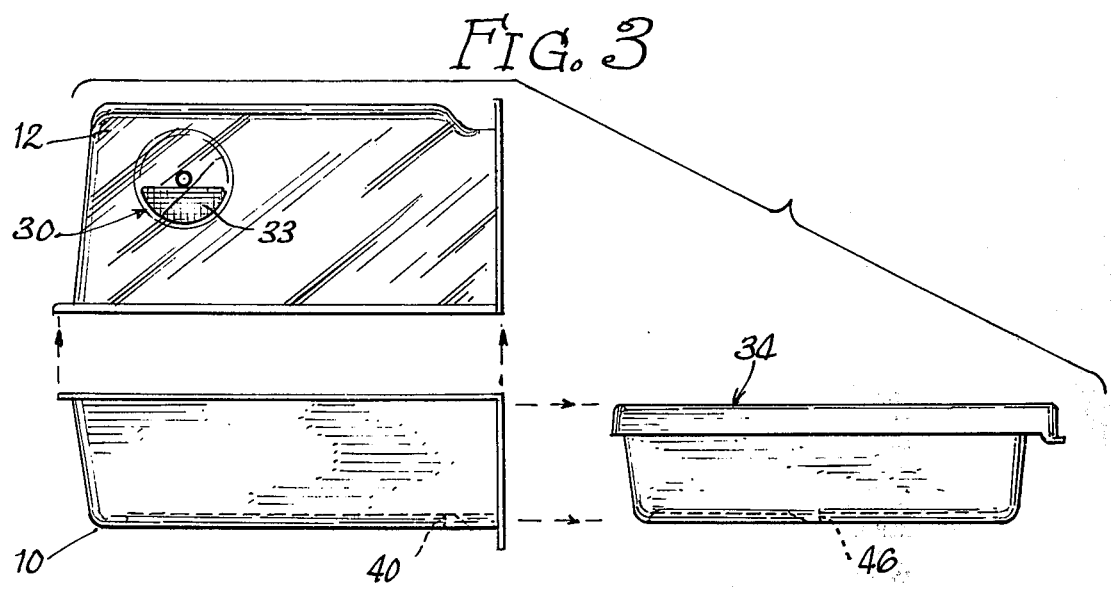
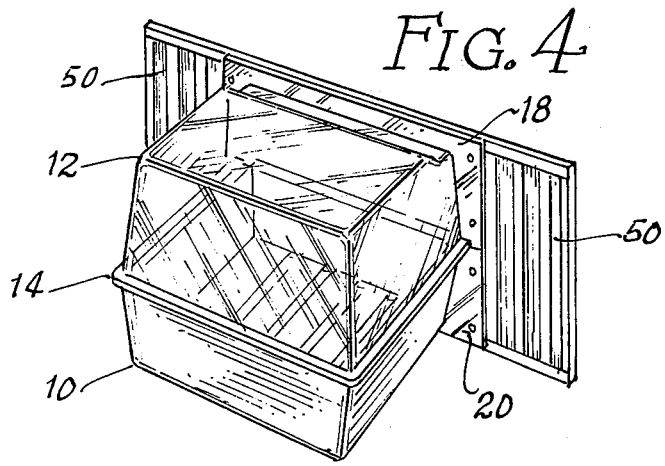

WINDOW MOUNTED PLANTER BOX

BACKGROUND OF THE INVENTION

This invention relates to window mounted planter boxes and the like. More specifically, it relates to a planter box which is capable of being installed in the window of a home or apartment and provides a controlled environment for houseplants, small outdoor flowering plants and the like. The device is intended to permit indoor growing of small outdoor plants during cold weather. By extending out from a window more sunlight than would normally be available indoors is obtained. Additionally, the humidity in the enclosed chamber can be more carefully controlled and drafts avoided.

The portion of the box which does not extend from the window is open so that the planter box communicates with the indoor environment. Thus, although the plants are maintained substantially outside for sunlight purposes, the temperature at which they are maintained is significantly closer to the indoor temperature than would otherwise be the case. When the device extends from a window which is wider than the planter box, a baffle curtain is provided to cover the excess window portion to prevent the entry of dirt, rain, cold air and the like.

By provision of a pull-out drawer on which the plants rest, it is easy to gain access to them for watering, removal and addition of other plants without removing the planter box from the window. A stop arrangement prevents complete accidental removal of the drawer and the resultant damage to the plants. The device is also provided with vents for adjusting the air flow through the chamber and for permitting or preventing the entry of outside air as desired by the user. It will be appreciated that the device can be used for indoor plants as well as outdoor plants. For example, it can be used to grow herbs, general houseplants, and particularly cacti, because of the dry warm heat that can be provided by the device.

It is accordingly an object of the invention to provide a window mounted planter box.

It is another object of the invention to provide a window mounted planter box which is capable of extending from a window to permit maximization of available sunlight.

It is another object of the invention to provide a window mounted planter box adapted for fitting an interior window and which includes a baffle curtain to fully close the window.

It is another object of the present invention to provide a window mounted planter box having a pull-out drawer arrangement for obtaining easy access to the contents of the planter box.

It is still another object of the invention to provide a window mounted planter box having an adjustable air ventilating system for increasing or decreasing the amount of air flowing through the device and for permitting or preventing entry of air from the outside.

Other objects and advantages of the invention will be apparent from the remaining portion of the specification.

BRIEF DESCRIPTION OF THE DRAWINGS

FIG. 1 is a side view of the device illustrating the general construction and arrangement and the mounting bracket therefor;

FIG. 2 is a rear view of the device illustrating the position the device takes when mounted in a window and viewed from the inside;

FIG. 3 illustrates the components of the device in their disassembled state;

FIG. 4 is a perspective of the device illustrating the baffle curtain provided for sealing the window;

DETAILED DESCRIPTION

Figure 5:
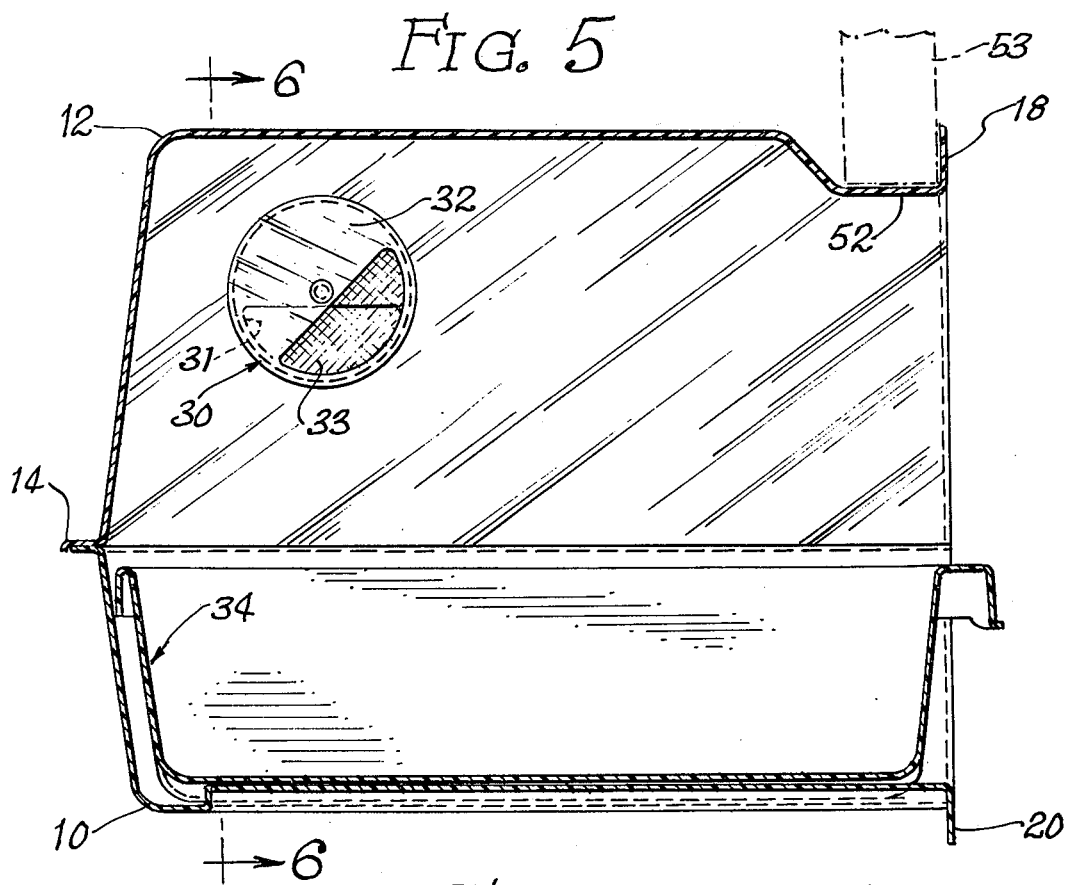
FIG. 5 is a cross-sectional view along the lines 5—5 of FIG. 2.
Figure 6:
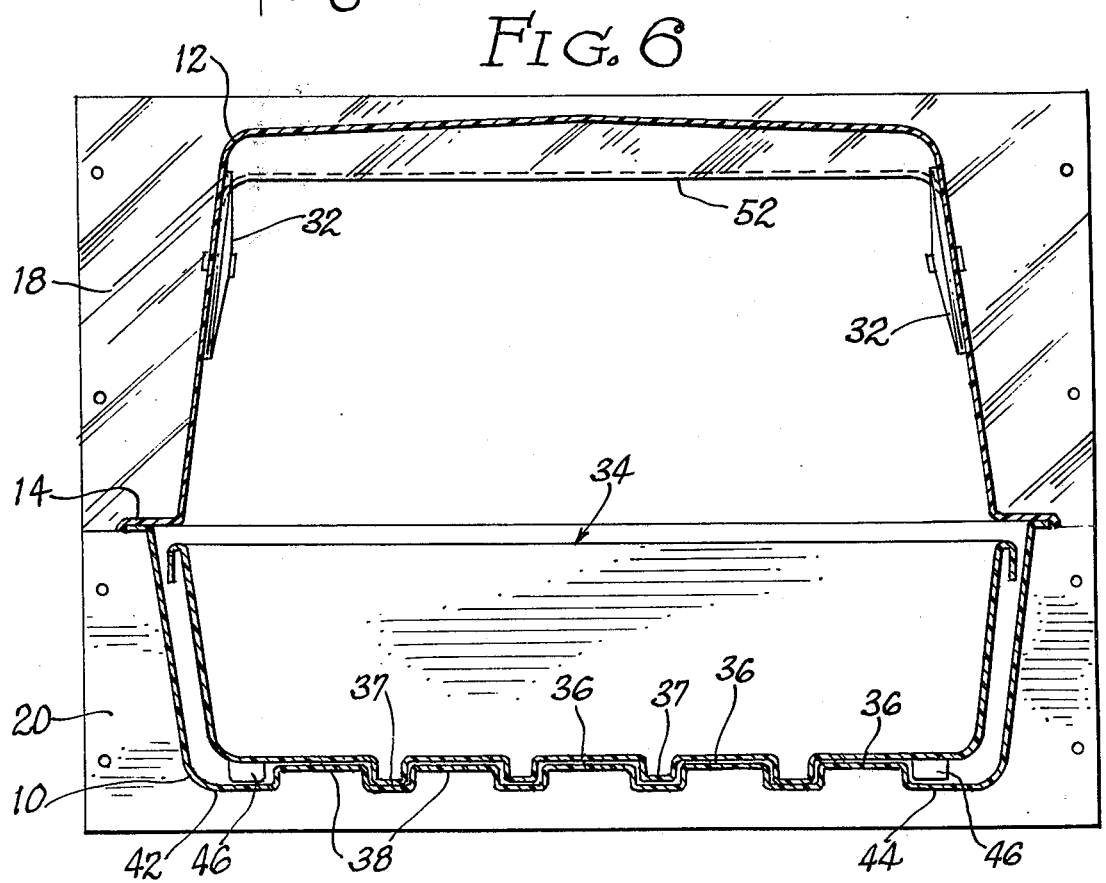
FIG. 6 is a cross-sectional view along the lines 6—6 of FIG. 1.

Referring now to FIGS. 1 and 2, there is illustrated a window mounted planter box, according to the present invention. The planter box includes a bottom 10 which is preferably formed of an opaque plastic material, although of course other materials may be utilized, and if desired, the bottom may be transparent. A top or cover 12 is provided and is adapted to fit over the bottom. A lip 14 extends over the edge of the bottom to secure the top in position. Preferably, the top 12 is formed of a clear plastic material and when assembled the top 12 and the bottom 10 define a substantially enclosed area adapted for receiving houseplants and the like. At the rear of the device a substantially rectangular opening is formed by both the cover 12 and the bottom 10. This opening provides access to the interior of the planter box and serves to communicate the interior of the device with the room environment. The cover and bottom terminate at the open end in flange portions 18 and 20, to which a suitable baffle curtain 50 may be mounted as indicated in FIG. 4. The flanges 18, 20 also serve to cooperate with the window in which the planter box is installed in a manner to be described.

Attached to the bottom 10, for example by sheet metal screws, is a window mounting device comprising a curved tubular shaft 22 having a hooked portion 24 and receiving an adjustable leg 26 therein. As will be apparent, when the planter box is installed in a conventional sash window, the hook 24 is engaged over the windowsill while the extended length of leg 26 is adjusted by means of a thumb screw 28 so that it provides a bracing support for the planter box against an outside wall directly beneath the window ledge.

As illustrated in FIG. 5, according to a preferred embodiment, the top 12 is provided with at least one, and preferably two, adjustable air vents 30. These vents comprise a semicircular opening 31 in the cover 12 and a disc 32 rotatably mounted to the cover coaxially with the center of the opening 31. The disc has a cutout portion 33 thereon, which may have screening thereover, which matches the opening 31. Alignment of the semicircular cut outs provides ventilation, misalignment closes the vent. Thus the vent permits or prevents the entry of outside air as desired.

As mentioned previously, the rear of the device communicates with the inside environment and so even when the vents 30 are closed, ventilation occurs. However, when the vents on the cover are open a much more effective and increased volume of air will pass through the planter box. Thus, on warm days the planter box can be fully ventilated, while on cool or wet days the vents may be closed to maintain the temperature and humidity of plants substantially close to the inside temperature and humidity.

The device includes a pull-out drawer 34 for receiving the plants therein. The drawer is provided with a ribbed bottom construction 36 such that the plants provided therein rest on the ribbed portion while permitting excess moisture which may come from watering the plants to drop into the channels 37 between the ribs. This construction prevents damage to the plant roots from sitting in water, strengthens the drawer and provides for effective humidification of the planter box to enhance the growing condition therein. The drawer 34 is slidable on the bottom 10 so that it may be fully or partially retracted therefrom to provide access to the plants for watering, removal, etc. In order to provide a good sliding relationship, the bottom 10 is provided with a matching set of ribs 38 which conform to the rib construction of the drawer 34.

In order to prevent the drawer from being fully retracted from the bottom 10 whereby accidental spilling of its contents might occur, an automatic stop feature is provided. This stop comprises a pair of raised projections 40 provided in the channels 42 and 44 of the bottom 10 (FIG. 2). These raised projections are provided near the rear portion of the bottom and are adapted to engage a corresponding set of projections 46 provided on both sides of the drawer 34. The projections 46 are located at about the middle of the drawer so that it is prevented from being withdrawn more than approximately half way from the planter box assembly. If, for purposes of cleaning or disassembly it is desired to fully remove the drawer 34, this is accomplished by lifting it clear of the projections 40 and is easily accomplished by first removing the top 12.

As indicated in FIG. 4, it is often desirable to provide a baffle curtain 50 on either end of the device. This baffle curtain is of the type utilized for window air conditioning units wherein the curtain serves to close off the portions of the window which are not filled by the planter box. By so doing, rain, dirt, insects and undesirable temperature extremes are prevented from interfering with the use of the room in which the planter box is installed. In a manner similar to room air conditioners, the baffle curtains 50 are deployed after the installation of the planter box in the window is accomplished. The curtains are merely extended to the edges of the window and secured by various arrangements such as screws, clips or the like.

As indicated in FIG. 5, the top portion 12 of the device has an indented or recessed portion 52 which is provided for receiving the window 53 thereon. When the window is placed in the recessed portion and the planter box securely anchored by the mounting device 22, a secure assembly is obtained in which there is a minimum leakage of the outside environment into the room. The flanges 18 and 20 prevent the possibility of the planter box falling out the window due to their abutting relation to the window and sill.

While I have shown and described an embodiment of this invention in some detail, it will be understood that this description and illustrations are offered merely by way of example, and that the invention is to be limited in scope only by the appended claims.

I claim:

1. A planter box for mounting in a window frame of a room comprising:

a drawer for supporting plants therein, said drawer having a plurality of ribs on its bottom;

a bottom shell having a bottom surface and a plurality of sides, said bottom shell being open at one side to slidingly receive said drawer therein, the bottom of said bottom shell having a ribbed construction matching the ribs of the drawer bottom whereby said drawer ribs nest in the bottom shell ribs to guide the entry and removal of said drawer from said bottom shell;

a top shell of transparent material having a top and a plurality of sides, said top shell being open at one side thereof corresponding to the open side of said bottom shell and supported on said bottom shell to form said planter box; and means for mounting said box in a position extending substantially out of said window frame with said open sides communicating the interior of said planter box with the environment of said room to moderate the temperature in said planter box while permitting substantial amounts of sunlight to reach said plants.

2. The device of claim 1 wherein said drawer and bottom shell have projections located thereon adapted to interengage when said drawer is withdrawn a selected distance from said bottom shell to prevent further withdrawal of said drawer.

3. The device of claim 1 wherein said top shell has a window engaging recess thereon.

4. The device of claim 1 wherein said top shell is provided with at least one adjustable vent communicating the interior of said planter box with the outside.

5. The device according to claim 4 wherein said vent comprises:

a semicircular opening in said top shell; and a rotatable disc mounted about said opening and having a corresponding semicircular opening therein whereby rotation of said disc permits a selected portion of said top shell opening to effect ventilation of the planter box with the outside.

6. The device according to claim 5 wherein said disc opening is provided with screening material thereover.

7. The device of claim 1 wherein said mounting means is attached to the bottom shell and includes:

a. a curved tubular shaft having a hooked end adapted to engage a sill portion of said window frame;

b. an adjustable leg telescoping into said tubular shaft; and c. means for securing said leg at a fixed position in said shaft said leg providing a bracing support for said planter box against an outside wall beneath said window frame.

8. The device according to claim 7 wherein said mounting means further includes a recessed portion in said top shell to receive the window therein.

9. The device of claim 1 wherein said planter box further includes:

a. flange portions on said top and bottom shells;

b. expandable baffle curtains mounted to said flanges on each side of said planter box to cover open areas of a window frame wider than the planter box.

* * * * *